United States Patent
Ohmuro et al.

(10) Patent No.: US 10,418,006 B2
(45) Date of Patent: Sep. 17, 2019

(54) LAMINATED PLYBOARD FOR MUSICAL INSTRUMENT, METHOD FOR MANUFACTURING THE SAME, AND MUSICAL INSTRUMENT

(71) Applicant: YAMAHA CORPORATION, Hamamatsu-shi (JP)

(72) Inventors: Hiroaki Ohmuro, Hamamatsu (JP); Yukimasa Okumura, Hamamatsu (JP); Hironao Nagashima, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 13 days.

(21) Appl. No.: 15/855,397

(22) Filed: Dec. 27, 2017

(65) Prior Publication Data
US 2018/0254028 A1    Sep. 6, 2018

(30) Foreign Application Priority Data
Mar. 2, 2017    (JP) .................................. 2017-039293

(51) Int. Cl.
G01D 13/02 (2006.01)
G10D 13/02 (2006.01)
B32B 21/04 (2006.01)

(52) U.S. Cl.
CPC ......... *G10D 13/028* (2013.01); *B32B 21/042* (2013.01); *B32B 2250/40* (2013.01); *B32B 2255/08* (2013.01)

(58) Field of Classification Search
CPC ................ G10D 13/028; B32B 21/042; B32B 2255/08; B32B 2250/40
See application file for complete search history.

(56) References Cited

U.S. PATENT DOCUMENTS

| 6,838,605 B2 | 1/2005 | Belli |
| 7,718,876 B1 | 5/2010 | Good |
| 8,022,281 B2 | 9/2011 | Abe et al. |

(Continued)

FOREIGN PATENT DOCUMENTS

| EP | 1355292 A1 | 10/2003 |
| EP | 2144225 A1 | 1/2010 |

(Continued)

OTHER PUBLICATIONS

Extended European Search Report issued in European Appln. No. 17210513.2 dated Jul. 6, 2018.

(Continued)

*Primary Examiner* — Kimberly R Lockett
(74) *Attorney, Agent, or Firm* — Rossi, Kimms & McDowell LLP

(57) ABSTRACT

A laminated plyboard for a musical instrument which reduces a loss of vibration energy due to internal friction while securing high rigidity with inexpensive cost. A laminated plyboard 20 comprises a first layer portion S1 including layers 24 and 25, a second layer portion S2 including layers 26 and 27, and an impregnated layer 21 impregnated with phenol and sandwiched between the first layer portion S1 and the second layer portion S2. A rigidity coefficient of the impregnated layer 21 is higher than rigidity coefficients of the layers 24 to 27 that configure the first layer portion S1 and the second layer portion S2.

16 Claims, 4 Drawing Sheets

(56) References Cited

U.S. PATENT DOCUMENTS

| | | | |
|---|---|---|---|
| 2003/0192422 A1* | 10/2003 | Belli | G10D 13/028 84/411 R |
| 2004/0108017 A1* | 6/2004 | Abe | B27K 3/08 144/329 |
| 2008/0173158 A1 | 7/2008 | Lee | |
| 2010/0005946 A1 | 1/2010 | Yoshino et al. | |

FOREIGN PATENT DOCUMENTS

| | | |
|---|---|---|
| JP | H1145087 A | 2/1999 |
| JP | 2003316349 A | 11/2003 |
| JP | 2009163112 A | 7/2009 |
| JP | 2010019992 A | 1/2010 |

OTHER PUBLICATIONS

Office Action issued in Japanese Appln. No. 2017-039293 dated Mar. 5, 2019. English translation provided.

* cited by examiner

LAMINATED PLYBOARD FOR MUSICAL INSTRUMENT, METHOD FOR MANUFACTURING THE SAME, AND MUSICAL INSTRUMENT

BACKGROUND OF THE INVENTION

Field of the Invention

The present invention relates to a laminated plyboard for a musical instrument used for a shell of a drum and the like, a method for manufacturing the laminated plyboard for the musical instrument, and a musical instrument such as a drum.

Conventionally, various types of a laminated plyboard for a musical instrument are known, and the laminated plyboard is used for the musical instrument such as drums, for example. In the drum, for example, the laminated plyboard is employed for a shell (drum body) over which a drumhead is stretched. As the laminated plyboard used for a shell, many layers of the laminated plyboard are made of wood because a warm sound can be obtained in terms of sound quality.

In a drum described in Japanese Laid-open Patent Publication (Kokai) No. 11-45087 A, a polygonal body (shell) is formed using a wood-based material or a non-wood-based material as the material for the body. By the way, in the shell having an internal veneer having low specific gravity sandwiched between plyboards each having high specific gravity, the internal veneer is held by the plyboard having high specific gravity from an outside thereof and thus an energy loss is large due to internal friction of vibration energy. Therefore, there is a problem that attenuation is too fast when applied to a drum and the sound volume tends to become relatively small. To cope with this, in Japanese Laid-open Patent Publication (Kokai) No. 2009-163112 A, a drum body is made of a plyboard having an internal veneer having high specific gravity (high rigidity) arranged in its central portion, the internal veneer held by outer veneers having lower specific gravity (lower rigidity) toward outside.

However, in Japanese Laid-open Patent Publication (Kokai) No. 11-45087 A, the shell has a polygonal structure and thus the stretched structure of the drum head has a special structure, and a typical head frame cannot be used. Further, in Japanese Laid-open Patent Publication(Kokai) No. 2009-163112 A, all veneers of the plyboard of the drum body are made of wood, and thus the cost becomes high. In particular, the internal veneer has high specific gravity, and the wood with high specific gravity is difficult to obtain and expensive, or in some cases, transaction is restricted. Therefore, there is a problem that decreasing the loss of vibration energy due to internal friction while suppressing an increase in the cost and securing high rigidity is not easy.

SUMMARY OF THE INVENTION

The present invention provides a laminated plyboard for a musical instrument, a method for manufacturing the same, and a musical instrument that reduce a loss of vibration energy due to internal friction while securing high rigidity with inexpensive cost.

Accordingly, a first aspect of the present invention provides a laminated plyboard for a musical instrument, the laminated plyboard including a first layer portion having at least one layer, a second layer portion having at least one layer, and an impregnated layer impregnated with phenol and sandwiched between the first layer portion and the second layer portion, wherein a rigidity coefficient of the impregnated layer is higher than rigidity coefficients of the layers that configure the first layer portion and the second layer portion.

Accordingly, a second aspect of the present invention provides a musical instrument including the above-described laminated plyboard for a musical instrument.

According to the first aspect of the present invention, the loss of vibration energy due to internal friction can be reduced while high rigidity is secured with inexpensive cost.

According to the first aspect of the present invention, a sound without distortion can be realized. In addition, according to the first aspect of the present invention, manufacturing by gluing is easy.

According to the second aspect of the present invention, the loss of vibration energy due to internal friction can be reduced while high rigidity is secured, and favorable sound characteristics can be obtained, with inexpensive cost.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings.

Figure 1A:
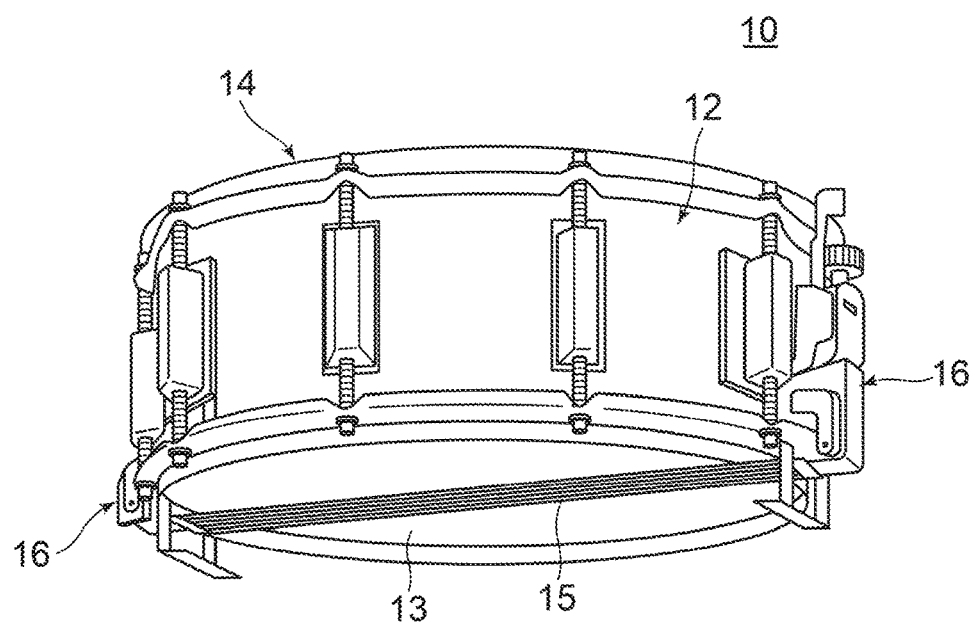
FIG. 1A is an external perspective view of a drum to which a laminated plyboard for a musical instrument according to an embodiment of the present invention is applied.

FIG. 1A is an external perspective view of a drum to which a laminated plyboard for a musical instrument according to an embodiment of the present invention is applied. A drum 10 in FIG. 1A is, for example, a snare drum. The drum 10 includes a shell 12 that is a drum body formed into a cylindrical shape with both ends open, and two drum heads 13 (only a back-side drum head is shown) stretched to cover both the openings of the shell 12. The drum heads 13 on the front and back sides are supported by a head support tension portion 14. A drum sound line 15 is stretched over the drum head 13 on the back side. The drum sound line 15 is selectively in contact with and separated from the drum head 13 on the back side by a backend mechanism 16 or the like.

Figure 1B:
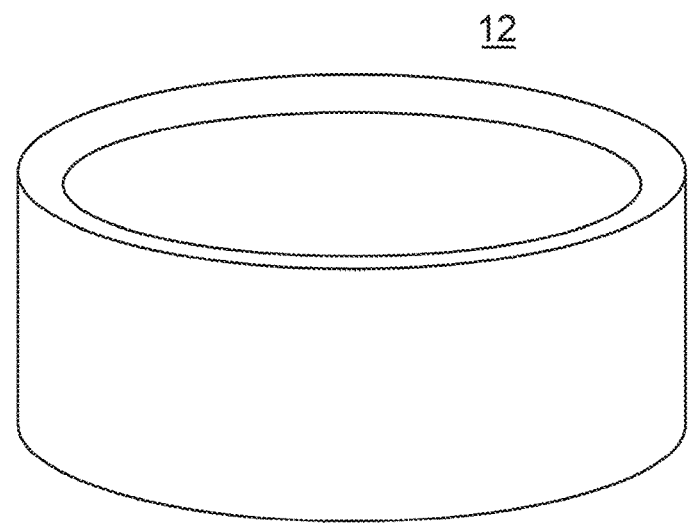
FIG. 1B is a perspective view of a shell provided in the drum of FIG. 1A.
Figure 2A:
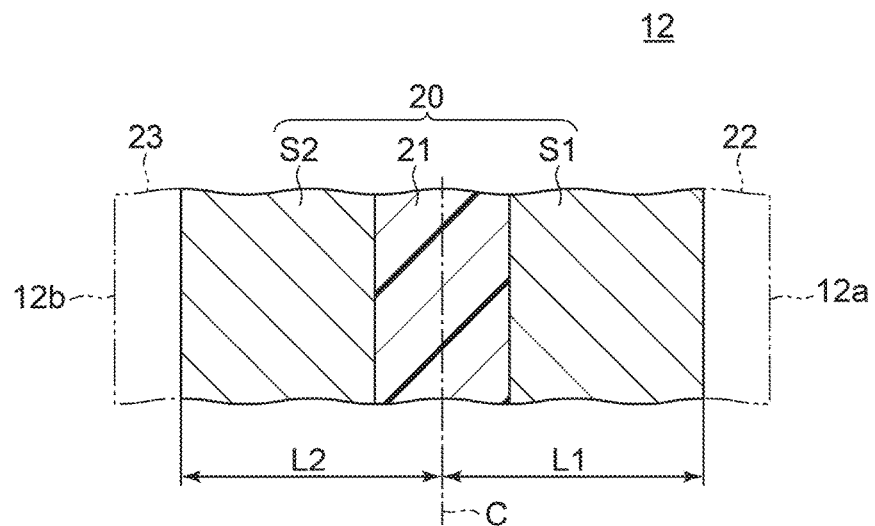
FIG. 2A is a partial longitudinal sectional view of the shell.

FIG. 1B is a perspective view of the shell 12. FIG. 2A is a partial longitudinal sectional view of the shell 12. A laminated plyboard 20 is used for a principal part of the shell 12. The laminated plyboard 20 is annularly deformed according to the shape of the shell 12 and used. As shown in FIG. 2A, a decorative plyboard 22 is glued on an outer peripheral surface side of the laminated plyboard 20, and a decorative plyboard 23 is glued on an inner peripheral surface side of the laminated plyboard 20. An outer peripheral surface of the decorative plyboard 22 serves as an outer peripheral surface 12a of the shell 12 and an inner peripheral surface of the decorative plyboard 23 serves as an inner peripheral surface 12b of the shell 12.

In the present embodiment, the laminated plyboard 20 has a three-layer structure in which an impregnated layer 21 impregnated with phenol is sandwiched and laminated between a first layer portion S1 and a second layer portion S2. Therefore, both the first layer portion S1 and the second layer portion S2 are veneers, and the second layer portion S2 is laminated on an opposite side of the first layer portion S1 across the impregnated layer 21. The impregnated layer 21 is formed by impregnating a phenol resin into a base material such as a paper. The specific gravity of the impregnated layer 21 is 1.0 to 2.0 and is about 1.2, for example, and the thickness thereof is about 0.8 mm, for example. The specific gravity of the impregnated layer 21 is larger than that of Jatoba (specific gravity: 0.9) of wood.

The material of the first layer portion S1 and the second layer portion S2 is common natural wood. As the wood applicable to the layer portions S1 and S2, wood having smaller specific gravity than the impregnated layer 21, and wood having specific gravity of 0.7 to 0.4 is selected, for example. Specific examples thereof include maple (specific gravity: 0.7), poplar (specific gravity: 0.45), birch (specific gravity: 0.71), mahogany (specific gravity: 0.65), and meranti (specific gravity: 0.55).

From the viewpoint of the elastic coefficient and the rigidity coefficient, the elastic coefficient (Pa) and the rigidity coefficient (Pa) of the impregnated layer 21 are higher than those of the layer portions S1 and S2. In the example of FIG. 2A, each of the layer portions S1 and S2 has a single-layer structure, and thus the elastic coefficient and the rigidity coefficient of the material of the layer portions S1 and S2 are reflected to directly the layer The first layer portion S1 and the second layer portion S2 are common in the thickness, and the thickness is 0.9 mm, for example. Here, an axis passing through the center of the impregnated layer 21 in the thickness direction and perpendicular to the thickness direction is defined as a central axis C. The laminated plyboard 20 has symmetrical structure about the central axis C in a plate status before being deformed for the shell 12. In the example of FIG. 2A, the central axis C is parallel to an axial direction of the shell 12. A distance L1 from the central axis C to an end surface of the first layer portion S1 and a distance L2 from the central axis C to an end surface of the second layer portion S2 are approximately equal in the thickness direction of the impregnated layer 21.

Since the layer portions S1 and S2 are common in both the thickness and the material, the bending rigidity (EI: E is a Young's coefficient and I is a geometrical moment of area) (Pa·m$^4$) of the first layer portion S1 with respect to the central axis C and the bending rigidity of the second layer portion S2 with respect to the central axis C are approximately equal. The bending rigidity referred here is bending rigidity with respect to the central axis C of when each of the first layer portion S1 and the second layer portion S2 is regarded as a beam. The central axis C corresponds to a neutral axis of the beam. It should be noted that, in the plate status before the laminated plyboard 20 is deformed for the shell 12, the bending rigidities of the layer portions S1 and S2 are assumed to be approximately equal even when any of axes passing through the center of the impregnated layer 21 in the thickness direction and perpendicular to the thickness direction is employed as the neutral axis (central axis C).

A gluing method similar to that of wood can be used for the impregnated layer 21 impregnated with phenol, and thus a conventional facility and processing steps can be used. It should be noted that each of the decorative plyboard 22 and 23 has a two-layer structure of wood, for example.

The specific gravity (or density) of the impregnated layer 21 sandwiched between the layer portions S1 and S2 is larger than that of the layer portions S1 and S2, and the elastic coefficient and the rigidity coefficient of the impregnated layer 21 are higher than those of the layer portions S1 and S2. From these facts, when the laminated plyboard 20 is used in an environment in which the laminated plyboard 20 vibrates, an energy loss due to internal friction of vibration energy becomes relatively small. Therefore, by use of the laminated plyboard 20 for the shell 12 of the drum 10, attenuation of a sound generated by striking is delayed, the sound can be heard with a relatively large volume, and a powerful sound and a good sound (a reverberation sound) are realized. Since the laminated plyboard 20 includes the highly rigid impregnated layer 21 in its center, the total rigidity of the laminated plyboard 20 is also high. It should be noted that the surface of the phenol resin is smoother and more homogeneous than a surface of wood, and is thus generally used as an outermost surface of a laminated material as a material to which a decorative paper (plate) etc. is glued and paint is applied. However, in the present embodiment, paying attention to the material characteristic of the phenol resin, the impregnated layer 21 is sandwiched and laminated between wood having lower rigidity coefficient (smaller specific gravity) than the impregnated layer 21, thereby to realize high rigidity and decrease in the energy loss.

Further, the first layer portion S1 and the second layer portion S2 are approximately equal to each other in the bending rigidity with respect to the central axis C. Therefore, vibration is similarly transmitted to both sides in the thickness direction of the impregnated layer 21. As a result, natural vibration characteristics and acoustic characteristics can be obtained, instead of generating a sound with distortion including a specific frequency component having a level difference. Also, while wood with high specific gravity is difficult to obtain and expensive, the impregnated layer 21 impregnated with phenol is inexpensive and easy to manufacture.

According to the present embodiment, in the laminated plyboard 20, the rigidity coefficient of the impregnated layer 21 is higher than those of the layer portions S1 and S2. Therefore, the loss of vibration energy due to internal friction can be reduced while high rigidity is secured with inexpensive cost. By application of the laminated plyboard 20 to the shell 12, good acoustic characteristics can be obtained.

Further, the first layer portion S1 and the second layer portion S2 are common in the thickness and the material, are symmetrical in the arrangement about the central axis C, and are approximately common in the bending rigidity with respect to the central axis C. With the configuration, a sound without distortion can be realized. In addition, since each of the layer portions S1 and S2 is formed of a single layer, the structure is simple and manufacturing is easy.

Figure 2B:
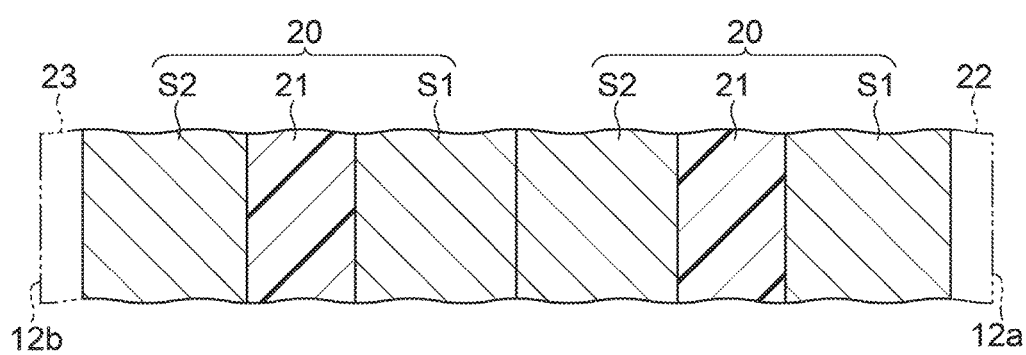
FIG. 2B is a partial longitudinal sectional view of the shell in which two layers of a laminated plyboard are stacked.

It should be noted that, in a case of applying the laminated plyboard 20 to the shell 12, the number of the laminated plyboard 20 is not limited to one, and two of the laminated plyboard 20 may be stacked and used, as shown in FIG. 2B. It should be noted that the number of the laminated plyboard 20 to be stacked is not limited.

It should be noted that, in the present embodiment, the layer portions S1 and S2 that sandwich the impregnated layer 21 are approximately the same in the thickness and the material and are formed of single layer in the laminated plyboard 20. However, each of the layer portions S1 and S2 may be formed of at least one layer, and different materials or layers having different thicknesses may be employed between the layer portions S1 and S2. Variations will be described with reference to FIGS. 3A to 3C.

Figure 3A:
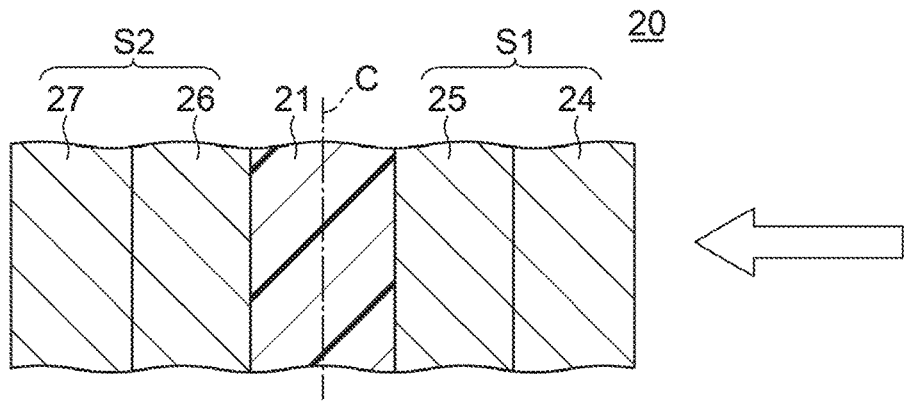
FIG. 3A is a partial longitudinal sectional view of a shell using a laminated plyboard according to a first variation.
Figure 3B:
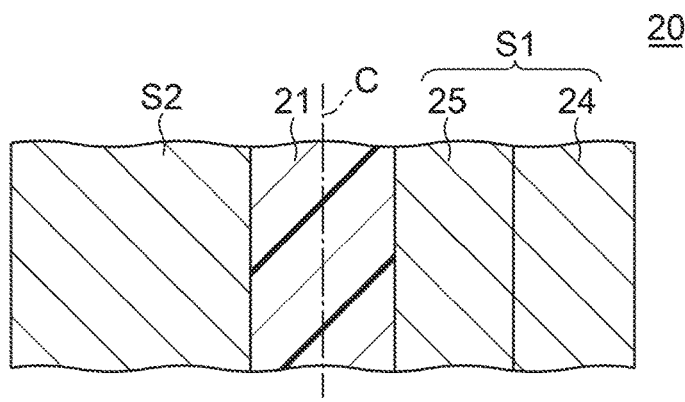
FIG. 3B is a partial longitudinal sectional view of a shell using a laminated plyboard according to a second variation.
Figure 3C:
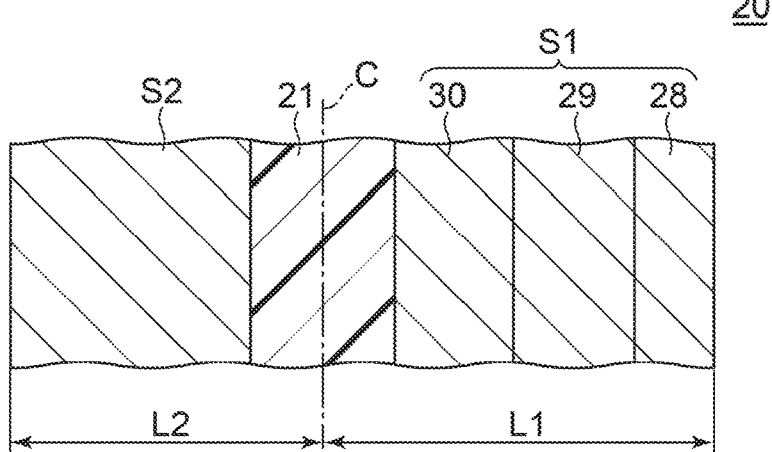
FIG. 3C is a partial longitudinal sectional view of a shell using a laminated plyboard according to a third variation.

FIGS. 3A to 3C are partial longitudinal sectional views of a shell 12 using laminated plyboard 20 according to one of first to third variations. In these drawings, illustration of decorative plyboard 22 and 23 is omitted. In the example of FIG. 3A, a first layer portion S1 has a two-layer structure in which layers 24 and 25 are laminated, and a second layer portion S2 has a two-layer structure in which layers 26 and 27 are laminated. All the layers 24, 25, 26, and 27 are wood. The thickness of the first layer portion S1 and the thickness of the second layer portion S2 are common. In this configuration, the specific gravity of an impregnated layer 21 is larger than the specific gravity of any of the layers 24 and 25 that configure the first layer portion S1 and the layers 26 and 27 that configure the second layer portion S2. Further, the rigidity coefficient and elastic coefficient of the impregnated layer 21 are higher than those of the layers 24 to 27. Further, the bending rigidity of the first layer portion S1 with respect to a central axis C is approximately equal to the bending rigidity of the second layer portion S2 with respect to the central axis C.

The thickness and arrangement of the layers that configure the first layer portion S1 and the thickness and arrangement of the layer that configure the second layer portion S2 are symmetrical about the central axis C. The layers 25 and 26, and the layers 24 and 27, which are layers arranged at symmetrical positions about the central axis C, are the same in the thickness and material. With the configuration, a similar effect to the example of FIG. 2A is exhibited in terms of realization of a sound without distortion. However, even if the thickness and arrangement of the layers that configure the first layer portion S1 and the thickness and arrangement of the layers that configure the second layer portion S2 are not symmetrical about the central axis C, the bending rigidity of the first layer portion S1 with respect to the central axis C and the bending rigidity of the second layer portion S2 with respect to the central axis C are made approximately equal, whereby the effect to reduce the loss of vibration energy due to internal friction to obtain favorably acoustic characteristics can be obtained. Therefore, it is not indispensable that the structure of the laminated plyboard 20 is symmetrical about the central axis C.

For example, as in the example of FIG. 3B, the first layer portion S1 may have a two-layer structure in which the layers 24 and 25 are laminated, and the second layer portion S2 may have a single-layer structure. In this example, the bending rigidity of the first layer portion S1 about the central axis C has been adjusted to be approximately equal to the bending rigidity of the second layer portion S2. Here, the bending rigidity of the first layer portion S1 depends on the material and thickness of the wood to be applied to the layers 24, 25, and means the bending rigidity of the first layer portion S1 as a whole. It should be noted that, strictly speaking, an adhesive that glues the layers 24 and 25 also affects the bending rigidity.

Further, as in the example of FIG. 3C, the first layer portion S1 may have a three-layer structure in which layers 28, 29, and 30 are laminated, and the second layer portion S2 may have a single-layer structure. In this example, the first layer portion S1 and the second layer portion S2 are different not only in the number of layers to configure but also in the thickness. Moreover, the distance L1 from the central axis C to the end surface of the first layer portion S1 and the distance L2 from the central axis C to the end surface of the second layer portion S2 do not accord. In this example, to make the bending rigidity of the first layer portion S1 with respect to the central axis C approximately equal to the bending rigidity of the second layer portion S2, the thickness and material of each of the layers 28, 29, and 30 and the second layer portion S2 are selected.

It should be noted that any of the laminated plyboard 20 in FIGS. 3A to 3C can be applied to the configuration in which the plural laminated plyboards 20 as shown in FIG. 2B are stacked. Further, it should be noted that the impregnated layer 21 is not limited to a veneer configuration, and may have a configuration in which a plurality of layers impregnated with phenol is stacked. In addition, the impregnated layer 21 in the present invention may include a thin layer or an adhesive layer other than the layer impregnated with phenol.

For example, one obtained by stretching and bonding a decorative paper over a phenol resin laminate may be treated as the impregnated layer 21.

Figure 4A:
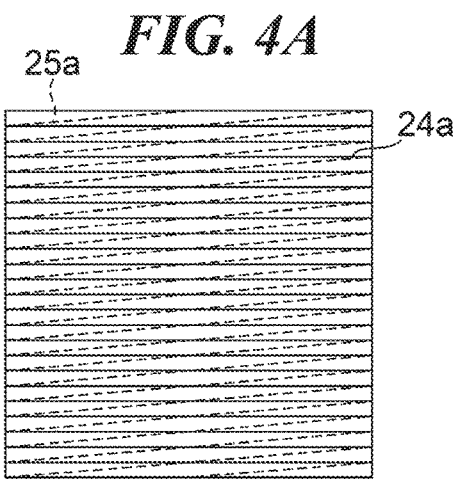
FIG. 4A is a view indicating a first variation of a method for laminating two layers in the laminated plyboard.
Figure 4B:
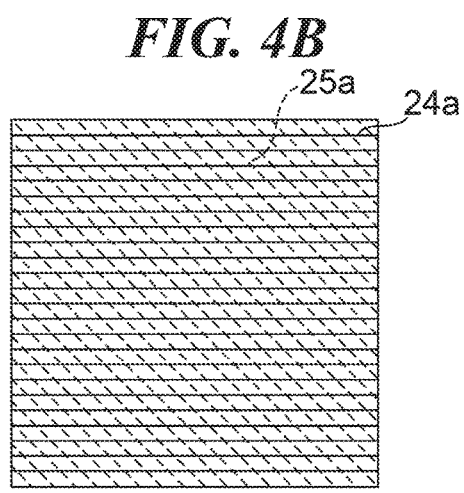
FIG. 4B is a view indicating a second variation of a method for laminating two layers in the laminated plyboard.
Figure 4C:
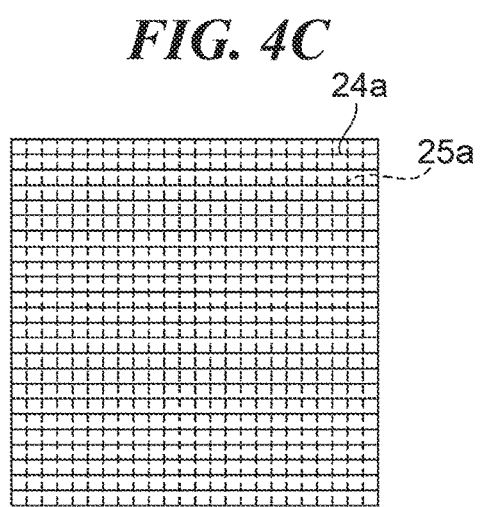
FIG. 4C is a view indicating a third variation of a method for laminating two layers in the laminated plyboard.

Further, the layer 24 and the layer 25 may be laminated such that wood grain 24a of the layer 24 and wood grain 25a of the layer 25 are shifted from each other when the laminated plyboard 20 is viewed along the arrow in FIG. 3A (FIG. 4A). It should be noted that, in FIG. 4A, the wood grain 24a of the layer 24 is shown by the solid line and the wood grain 25a of the layer 25 is shown by the broken line. Typically, wood has the highest bending rigidity along the wood grain. By shifting the wood grain 24a of the layer 24 and the wood grain 25a of the layer 25 from each other, the laminated plyboard 20 can have high bending rigidity in two directions. Therefore, the overall rigidity of the laminated plyboard 20 can be enhanced. In particular, the overall rigidity of the laminated plyboard 20 can be increased as the angle between the wood grain 24a of the layer 24 and the wood grain 25a of the layer 25 is increased. For example, it is favorable that the wood grain 24a and the wood grain 25a are shifted from each other by 45° or more (FIG. 4B). When the wood grain 24a and the wood grain 25a are shifted from each other by 90° (FIG. 4C), the overall rigidity of the laminated plyboard 20 can be maximized. Further, if the layer 24 is arranged such that the wood grain 24a of the layer 24, which is positioned outside the layer 25 and attracts people's attention, goes along a peripheral direction of the shell 12, a favorable sense of beauty for a viewer can be provided.

It should be noted that the laminated plyboard 20 is applicable not only to the snare drum but also to various types of percussion instrument such as a bass drum and a tom-tom. Further, the present invention is not limited to the drums and may be applied to parts related to sound in musical instruments. For example, the present invention may be applied to a body (a front plate, a back plate and/or a side plate) of a guitar, a side plate of a piano, or the like. Further, although the laminated plyboard 20 is configured as laminated plyboard for musical instruments, the laminated plyboard 20 can also be applied to various other uses other than the musical instrument.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039293 filed on Mar. 2, 2017 which is hereby incorporated by reference herein in their entireties.

What is claimed is:

1. A laminated plyboard for a musical instrument, the laminated plyboard comprising:
   a first layer portion including at least one layer;
   a second layer portion including at least one layer; and
   an impregnated layer impregnated with phenol and sandwiched between the first layer portion and the second layer portion,
   wherein a rigidity coefficient of the impregnated layer is higher than rigidity coefficients of the layers that configure the first layer portion and the second layer portion, and
   wherein a bending rigidity of the first layer portion with respect to a central axis passing through a center of the impregnated layer in a thickness direction and perpendicular to the thickness direction, and a bending rigidity of the second layer portion with respect to the central axis are equal.

2. The laminated plyboard for a musical instrument according to claim 1, wherein the impregnated layer is made of a paper impregnated with phenol.

3. The laminated plyboard for a musical instrument according to claim 1, wherein specific gravity of the impregnated layer is 1.0 to 2.0, and specific gravity of the first layer portion and the second layer portion is 0.4 to 0.7.

4. The laminated plyboard for a musical instrument according to claim 1, wherein both the layers that configure the first layer portion and the second layer portion are made of wood.

5. The laminated plyboard for a musical instrument according to claim 4, wherein the first layer portion has a two-layer structure in which two layers are laminated in a thickness direction of the laminated plyboard for the musical instrument.

6. The laminated plyboard for a musical instrument according to claim 5, wherein the second layer portion has a two-layer structure in which two layers are laminated in the thickness direction of the laminated plyboard for the musical instrument.

7. The laminated plyboard for a musical instrument according to claim 6, wherein decorative plyboard is attached to a surface of the first layer portion, the surface being on an opposite side of the impregnated layer.

8. The laminated plyboard for a musical instrument according to claim 5, wherein the two layers are laminated such that wood grain of the laminated two layers is shifted from each other.

9. The laminated plyboard for a musical instrument according to claim 8, wherein the wood grain of the laminated two layers is shifted from each other by 45° or more.

10. The laminated plyboard for a musical instrument according to claim 9, wherein the wood grain of the laminated two layers is shifted from each other by 90.

11. A musical instrument comprising:
    the laminated plyboard for a musical instrument according to claim 1.

12. The musical instrument according to claim 11, wherein
    the musical instrument is a drum, and
    the laminated plyboard for a musical instrument is used for a shell of the drum.

13. A laminated plyboard for a musical instrument, the laminated plyboard comprising:
    a first layer portion including at least one layer;
    a second layer portion including at least one layer; and
    an impregnated layer impregnated with phenol and sandwiched between the first layer portion and the second layer portion,
    wherein a rigidity coefficient of the impregnated layer is higher than rigidity coefficients of the layers that configure the first layer portion and the second layer portion, and
    wherein thickness and arrangement of layers that configure the first layer portion and thickness and arrangement of layers that configure the second layer portion are symmetrical about a center of the impregnated layer in a thickness direction, and material of the layers arranged at symmetrical positions is common.

14. A musical instrument comprising:
    the laminated plyboard for a musical instrument according to claim 13.

15. A laminated plyboard for a musical instrument, the laminated plyboard comprising:
    a first layer portion including at least one layer;
    a second layer portion including at least one layer; and
    an impregnated layer impregnated with phenol and sandwiched between the first layer portion and the second layer portion,
    wherein a rigidity coefficient of the impregnated layer is higher than rigidity coefficients of the layers that configure the first layer portion and the second layer portion,
    wherein the first layer portion and the second layer portion have an approximately same thickness and are made of a single layer, and
    wherein rigidity coefficients of the respective single layers are equal.

16. A musical instrument comprising:
    the laminated plyboard for a musical instrument according to claim 15.

* * * * *